US 6,680,352 B2

(12) United States Patent
Vogt et al.

(10) Patent No.: US 6,680,352 B2
(45) Date of Patent: Jan. 20, 2004

(54) TEXTILE-ELASTOMER COMPOSITE PREFERABLE FOR TRANSFER OR FILM COATING AND METHOD OF MAKING SAID COMPOSITE

(75) Inventors: Kirkland W. Vogt, Simpsonville, SC (US); Howell B. Eleazer, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/287,734

(22) Filed: Nov. 4, 2002

(65) Prior Publication Data

US 2003/0049432 A1 Mar. 13, 2003

Related U.S. Application Data

(63) Continuation of application No. 09/602,122, filed on Jun. 23, 2000, now Pat. No. 6,475,562.

(51) Int. Cl.$^7$ ................................................ B05D 3/04
(52) U.S. Cl. ........................ 524/282; 524/306; 524/315; 524/591; 528/49; 528/84
(58) Field of Search ................................ 524/282, 306, 524/315, 591; 528/49, 84

(56) References Cited

U.S. PATENT DOCUMENTS

| | | | |
|---|---|---|---|
| 3,100,721 A | 8/1963 | Holden | |
| 3,208,875 A | 9/1965 | Holden | |
| 3,228,786 A | 1/1966 | Fitzgerald et al. | |
| 3,412,054 A | 11/1968 | Milligan et al. | |
| 3,480,592 A | 11/1969 | Dieterich et al. | 260/77.5 |
| 3,565,844 A | 2/1971 | Grace et al. | 260/29.2 |
| 3,669,784 A * | 6/1972 | Yokota et al. | 156/148 |
| 3,695,924 A | 10/1972 | Wagner | 117/76 |
| 3,705,226 A | 12/1972 | Okamoto et al. | 264/162 |
| 3,959,049 A | 5/1976 | Tanaka et al. | 156/79 |
| 3,969,551 A | 7/1976 | Ellsworth | 427/282 |
| 3,989,870 A | 11/1976 | Bocks et al. | 428/315 |
| 4,035,213 A | 7/1977 | Thoma et al. | 156/231 |
| 4,046,729 A | 9/1977 | Scriven et al. | 260/29.2 |
| 4,053,546 A | 10/1977 | Yamasaki et al. | 264/49 |
| 4,094,847 A | 6/1978 | Huffman et al. | 260/29.4 |
| 4,102,719 A | 7/1978 | Fujii et al. | 156/78 |
| 4,137,209 A | 1/1979 | Wong et al. | 260/29.6 |
| 4,171,391 A | 10/1979 | Parker | 427/246 |
| 4,203,883 A | 5/1980 | Hangauer, Jr. | 260/29.2 |
| 4,233,359 A | 11/1980 | Mimura et al. | 428/254 |
| 4,277,380 A | 7/1981 | Williams et al. | 260/18 TN |
| 4,299,868 A | 11/1981 | Berndt et al. | 427/389.9 |
| 4,332,710 A | 6/1982 | McCartney | 524/591 |
| 4,336,300 A | 6/1982 | Lorant et al. | 428/316.6 |
| 4,420,507 A | 12/1983 | Marco | 427/170 |
| 4,434,205 A | 2/1984 | Fujii et al. | 428/218 |
| 4,452,834 A | 6/1984 | Nachtkamp et al. | 427/379 |
| 4,632,960 A | 12/1986 | Sato et al. | 525/117 |
| 4,657,957 A | 4/1987 | Baumann et al. | 524/245 |
| 4,741,075 A * | 5/1988 | Taguchi et al. | 528/104 |
| 4,833,173 A | 5/1989 | Spek et al. | 521/72 |
| 4,842,926 A | 6/1989 | Sawa et al. | 428/224 |
| 4,886,702 A | 12/1989 | Spek et al. | 428/308.4 |
| 5,156,900 A | 10/1992 | Nishimura | 428/151 |
| 5,183,695 A | 2/1993 | Masuhra et al. | 428/151 |
| 5,277,969 A | 1/1994 | Borri et al. | 428/252 |
| 5,518,800 A | 5/1996 | Okawa et al. | 428/151 |
| 5,876,466 A | 3/1999 | Nakashima et al. | 8/442 |
| 5,916,636 A | 6/1999 | Vogt | 427/389.9 |

FOREIGN PATENT DOCUMENTS

| | | | |
|---|---|---|---|
| GB | 2093051 | | 8/1982 |
| JP | 52-087469 | * | 7/1977 |
| JP | 11-335975 | * | 12/1999 |

* cited by examiner

*Primary Examiner*—Erma Cameron
(74) *Attorney, Agent, or Firm*—Terry T. Moyer; Charlotte C. Wilson

(57) ABSTRACT

The present, invention relates to a process for producing a fabric-elastomer composite that, when transfer or film coated, is preferable for use as an artificial leather substrate. The inventive procedure involves (a) producing an elastomer composition of at least four ingredients (an anionically-stabilized waterborne polymer dispersion, an acid-generating chemical, a cloud-point surfactant, and a foam-stabilizing surfactant); (b) incorporating sufficient gas into the liquid mixture to generate a spreadable foam; (c) applying the foam onto a porous textile substrate; (d) heating said foamed fabric until the elastomer coagulates over the fabric substrate; and (e) drying the resultant composite without destroying the coagulated structure. The resultant composite obtains a suppleness that is similar to that of leather and a surface that is suitable for transfer coating to produce artificial leather. The composite may be utilized as upholstery fabric in furniture or in automobiles, apparel, and the like. The particular composites produced are also contemplated within this invention.

4 Claims, No Drawings

TEXTILE-ELASTOMER COMPOSITE PREFERABLE FOR TRANSFER OR FILM COATING AND METHOD OF MAKING SAID COMPOSITE

RELATED APPLICATIONS

This application is a continuation of U.S. patent application Ser. No. 09/602,122, filed on Jun. 23, 2000 now U.S. Pat. No. 6,475,562, of Kirkland W. Vogt and Howell B. Eleazer for A FABRIC/ELASTOMER COMPOSITE PREFERABLE FOR TRANSFER-COATING AND METHOD OF MAKING SAID COMPOSITE.

TECHNICAL FIELD

The present invention relates to a process for producing a textile material that, when transfer or film coated, is preferable for use as an artificial leather substrate. The inventive procedure involves (a) producing an elastomer composition of at least four ingredients (a waterborne anionically-stabilized polymer dispersion, an acid-generating chemical, a cloud-point surfactant, and a foam-stabilizing surfactant); (b) incorporating sufficient gas into the liquid mixture to generate a foam; (c) applying the foamed elastomer composition onto a porous textile substrate; (d) heating the treated textile until the elastomer coagulates over the textile substrate; and (e) drying the resultant composite without destroying the coagulated structure. The resultant composite, herein disclosed, exhibits a suppleness that is similar to that of leather and a surface that is suitable for transfer or film-coating to produce artificial leather. The four-ingredient pre-mixture is a long-lasting, shelf-stable composition which will not react until it is exposed to sufficient amounts of heat, thus providing an improvement over the prior art. The particular compositions produced are also contemplated within this invention.

DISCUSSION OF THE PRIOR ART

Polymer latexes (e.g., polyurethane and acrylate) have been utilized in a variety of ways, most notably as coatings or finishes on fabric surfaces. Such latexes may provide, for example, a barrier to potentially adverse environmental conditions. Furthermore, leather substitutes have also been produced through the use of waterborne polymer latexes. Such substitutes provide an alternative to more expensive, genuine leather articles. Such artificial leather substrates must exhibit the suppleness and appearance that are characteristic of genuine leather, and must withstand heavy and repeated use within automobile and furniture upholstery, for example.

Previous polyurethane-based leather substitute products include composites produced through the reaction of a polyurethane latex and an acid-generating chemical (specifically, hydrofluorosilicic salts). Such a composition is disclosed in U.S. Pat. No. 4,332,710, to McCartney, entirely incorporated herein by reference. McCartney teaches heat-activated coagulation of a polyurethane latex in conjunction with only an acid-generating chemical, such as salts of hydrofluorosilicic acid. Such a composition and method present some difficulties, primarily in the use of an acid-generating chemical alone to provide ionic coagulation. This two-component system often results in a non-uniform distribution in the textile substrate and can form stringy structures, which are unattractive as suede leather substitutes. Of particular concern are the environmental and safety issues associated with the use of hydrofluorosilicic acid salts, which are highly discouraged within the industry but which are patentee's preferred acid-generating chemicals.

Other prior teachings involving polymer latex heat-activated coagulation include U.S. Pat. No. 4,886,702 to Spek et al. The '702 patent discloses a method utilizing a composition comprising a waterborne polymer latex (including polyurethane and acrylate), a cloud-point surfactant coagulant, and a blowing agent, which evolves gas during heating. However, such a composition does not produce preferable leather-like textile products due to the stiff hand that results from the effect of the blowing agent. Second, the preferred blowing agent is freon, which is being phased out of production due to its deleterious environmental impact. Third, the coagulation process requires the addition of acid and/or salt compounds, which have the potential to coagulate the latex mixture prior to contact with a textile substrate, thus resulting in a non-uniform dispersion on the substrate surface. Last, the shelf-life of patentees' composition is, at a maximum, only eight hours in duration, thereby placing certain limitations on manufacturing flexibility.

Furthermore, U.S. Pat. No. 4,171,391, to Parker, teaches polyurethane latex coagulation within an aqueous ionic or acid bath. Because the determining factors are the type and amount of ionic material (or acid) and the rate of diffusion of such a constituent from the bath to the substrate material, such a procedure is difficult to control. As a result, there is a lack of consistent uniform dispersion and coagulation from one textile substrate to another. Particularly with heavier fabric substrates, the necessary contact times may be as long as 30 minutes, translating into high costs for the manufacturer and, ultimately, the consumer.

These shortcomings indicate a need, then, within the industry, for improved leather-like textile-elastomer composites, which are relatively inexpensive to make, which have a more realistic appearance and improved aesthetic qualities when transfer or film coated, and which have an overall better performance over the prior art.

SUMMARY

This invention concerns a leather-like textile-elastomer composite, and a method of producing this composite, the method comprising the sequential steps of:
(a) providing a textile fabric;
(b) producing a liquid elastomer composition comprising:
   (i) a waterborne, anionically-stabilized polymer latex;
   (ii) an acid-generating chemical;
   (iii) a cloud-point surfactant; and
   (iv) a foam-stabilizing surfactant,
   wherein sufficient gas is incorporated into the liquid elastomer composition to produce a foamed elastomer composition;
(c) applying the foamed elastomer composition of (b) to the textile fabric of (a);
(d) heating the coated textile to an initial temperature to effectuate a uniform dispersion and cause coagulation of said elastomer composition over the textile fabric; and
(e) subsequently heating the coagulated fabric to a temperature higher than the temperature utilized in step (d) in order to dry, but not destroy, the coagulated elastomer over the fabric.

Also, the invention concerns the elastomer composition of step (b) of the inventive method itself.

It is thus an object of the invention to provide an improved, more aesthetically pleasing leather-like fabric-elastomer composite. The term fabric-elastomer composite refers to an article comprised of a textile fabric, which has been coated on at least one side with an elastomer composition. An object of the invention is to provide a composite that has a more realistic, leather-like appearance and is more aesthetically pleasing when transfer or film-coated. A further object of the invention is to provide a relatively inexpensive method of making such a composite, by providing an elastomer latex with a shelf-life of at least two weeks and by providing an application method that allows greater manufacturing control. Another object of the invention is to provide a method of producing a leather-like article which includes environmentally safe, nontoxic, low odor, noncombustible chemicals. Yet another object of this invention is to provide leather-like composites, which when transfer or film-coated, are suitable for all intended uses in which a user requires or desires a faux-leather substrate.

Nowhere within the prior art has such a specific heat-activated coagulating method utilizing a foamed elastomer composition comprising a waterborne, anionically-stabilized latex, an acid-generating compound, a cloud-point surfactant, and a foam-stabilizing surfactant been disclosed, practiced, or fairly suggested. Such an elastomer composition provides a significant advantage over the two-component (latex and acid-generator) and different three component (latex, cloud-point surfactant, and blowing agent) compositions of the prior art. For instance, the inventive composition has a shelf-life measured in weeks (at least two weeks of stability and non-coagulation after initial admixing) instead of hours at a temperature as high as about 38° C. (100° F.). The coagulation occurs only after exposure to a heat source of sufficient temperature to effectuate such reactivity (such as temperatures greater than about 80° C. or 176° F.).

Additionally, the utilization of foaming to apply the inventive latex coating facilitates production through the ability to control more effectively the amount of coating applied, the depth of penetration of the coating into the fabric, and the rate and uniformity of the coagulation process. The prior art's teachings do not permit such an extensive and beneficial ability to manipulate the amount of penetration and the location of the coating while controlling the coagulation reaction. In particular, the inventive method and composition provide a high level of coagulant uniformity within single composite substrates and also allow uniformity of appearance and performance between many different composites at the large-scale manufacturing level.

Yet another improvement available with the inventive method and composition is the use of a strictly aqueous system rather than an organic solvent-based system. Avoidance of organic materials provides less volatility, odor, combustibility, and toxicity as well as increasing the heat stability of the final product. Of particular benefit is the ability to utilize the inventive aqueous composition in conjunction with other compatible aqueous chemical systems used in other areas of textile manufacturing. Such adaptability and compatibility with other textile manufacturing procedures and materials is very important, for example, in reducing the chances of toxic emissions during textile processing.

Finally, and perhaps most importantly, the inventive method and composition impart a soft, fine-structured coagulum leather-like finish to fabrics which is comparable to, if not better than, leather-like finishes produced with organic solvent-borne systems (such as those described in U.S. Pat. No. 4,886,702, noted above). Thus, the inventive method and composition provide the means to produce, in a very safe manner, a fabric-elastomer composite having a desirable suppleness and appearance, which, when transfer or film-coated, effectively simulates a genuine leather article.

The term fabric-elastomer composite refers to an article comprised of a textile fabric, which has been coated on at least one side with an elastomer composition. As noted above, the inventive foamed elastomer composition comprises five materials: a waterborne polyurethane latex, an acid-generating chemical, a cloud-point surfactant, a foam-stabilizing surfactant, and sufficient gas that, when incorporated, produces the foamed product.

An anionically-stabilized polymer latex is an emulsion or dispersion formed from a polymer, an anionic surfactant, and water. Polyurethane, acrylic, or polyurethane-acrylic latex is preferable, but any waterborne anionically-stabilized polymer latex may be used. The preferred latexes are those having at least a 30% solids content, with greater than 50% solids being more preferred. One preferred example of an anionically-stabilized polyurethane latex is EX-62-655 (40% solids), available from Stahl. A suitable anionically-stabilized polyurethane-acrylic latex is Paranol T-6330 (50% solids), available from Parachem. Examples of suitable anionic surfactants for use in the polymer dispersion include, but are not limited to, poly-acrylic acid copolymers, sodium laurel sulfate, aryl and alkyl benzene sulfonate like, but not limited to, the proprietary Rhodacal DS-10 (from Rhodia). In addition to the anionic surfactant and water, a nonionic surfactant may also be included in the polymer dispersion. Examples of a nonionic surfactant include polyvinyl alcohol and ethoxylated surfactants, such as Pluronic F-68 (from BASF). Also well known in the art is the incorporation of carboxyl or sulfate groups into the backbone of the polymer in order to help stabilize the latex. The waterborne criterion is of utmost importance within this invention primarily to insure that potentially environmentally harmful organic solvents are not present within the elastomer composition.

The term acid-generating compound denotes a chemical which is not an acid at room temperature, but which produces an acid upon exposure to a heat source. Examples include, but are not limited to, ammonium acid salts like ammonium sulfate, ammonium phosphate, and organic acid esters. One particularly suitable class of compounds that both meet this description and that provide superior results with little or no harmful environmental impact are organic acid esters. Some specific types of these compounds include ethylene glycol diacetate, ethylene glycol formate, diethylene glycol formate, triethyl citrate, monostearyl citrate, a proprietary organic acid ester available from High Point Chemical Corporation under the tradename Hipochem AG-45, and the like. The most preferred compound is ethylene glycol diacetate, available from Applied Textile Technologies under the tradename APTEX™ Donor H-plus.

The term cloud-point surfactant is intended to encompass any surface-active agent that becomes less water soluble upon exposure to higher temperatures. This type of surfactant easily binds with the polymer latex upon gelling and facilitates the uniform coagulation of the latex over the entire contacted textile substrate. Specific surfactants that meet such requirements include poly(ethylene) oxides, poly(ethylene/propylene) oxides, polythio ethers, polyacetals, polyvinylalkyl ethers, organo-polysiloxanes, polyalkoxylated amines, or any derivatives of these listed compounds, with the preferred being polyalkoxylated amines, available from Clariant under the tradename Cartafix U™.

The term foam-stabilizing surfactant includes any surface-active agent that improves the ability of the inventive composition to entrain, and retain, air. Particular examples include, but are not limited to, alkyl benzene sulfates and sulfonates (Rexoprene series from Emkay Chemical) like sodium laurel sulfate (also sold under the name Stephanol AM from Stepan Corporation), sodium dioctyl sulfosuccinate, dodecyl benzene sulfonate, alkyl amine oxides (Unifroth series from Unichem Corp.), alkyl phosphates (Synfac series from Milliken Chemical), ammonium stearate (Henkel), water-soluble cellulose derivatives (Hercules Inc.), and Alkasurf DAP-9 (Rhodia). In the absence of a foam-stabilizing surfactant, gas could be introduced into the elastomer composition, but the gas would not be incorporated or retained.

The proportions required within the inventive elastomer composition are based upon the ratio of weights between the latex and each of the remaining components. For instance, ratios between the latex and each of the other components (namely, the acid-generating compound, the cloud-point surfactant, and the foam-stabilizing surfactant) should be in the range of 5:1 to 200:1, with preferred ranges of from about 10:1 to about 50:1. The Examples below further illustrate the utilization of such ranges of weight ratios.

The gas associated with the foam production is selected from the group consisting of atmospheric air, mixtures of oxygen, nitrogen, and hydrogen, and the like. Atmospheric air is preferred as an inexpensive and readily available source. The gas is incorporated at a pressure in the range of 1 pound per square inch (gauge) to 100 pounds per square inch (gauge), with a preferred range of about 25 p.s.i.g. to about 50 p.s.i.g. The acceptable weight ratio of air to latex within the composition is in the range of 0.1:1 to 50:1, with a preferred range of 3:1 to 8:1.

The air, or other gas, is incorporated into the foam by mechanical agitation. The air-incorporation process, commonly called foaming, may be accomplished through any accepted procedure. Examples, not intended as limitations, include whipping with a Hobart mixer or a Gaston Systems mechanical foamer. The foamed elastomer composition can then be applied with screen coating, knife coating, parabolic foam coating, and the like, without any limitation intended.

It has been found that incorporating air into (or foaming) the inventive composition offers several benefits over conventional application methods. First, the amount of elastomer applied to the textile substrate is less than the amount that would be used in a dip application, thus resulting in cost savings to manufacture. Secondly, because the incorporated air reduces the density of the inventive composition, the substrates that are produced following coagulation have aesthetic properties that more closely resemble leather. In addition, the air incorporated into the foam increases the volume of the coating, improving application and creating an improved surface for transfer coating. Finally, the manufacturer has greater control over the application of the elastomer. As a result, the foam mixture does not have to be applied to both sides of the fabric, as it would be with a dip application. Further, the degree of penetration of the foam into the textile substrate can also be controlled.

Subsequently, the elastomer-coated textile fabric is heated. This heating step generates an acid and gels the cloud-point surfactant, which then uniformly coagulates the inventive latex over the entire substrate. The temperature required to initiate the reaction depends on the particular acid-generating compound utilized. However, in general, the requisite temperature should be at least 80° C., with a high temperature being about 130° C.

The boiling point of water is the preferred temperature, particularly where a steam application (and most preferably a saturated steam application of 100° C. to 110° C.) is used. Such conditions are preferred because moist heat (steam) provides the most effective exposure for the elastomer composition. The presence of moisture permits a greater level of control over the reaction since the addition of dry heat generally vaporizes the aqueous portion of the inventive latex, which promotes the undesirable formation of a continuous polymer film. The latex must remain moist in order for proper and uniform coagulation to ensue. Therefore, the elastomer composition preferably must contain water during the entire reaction. An exposure time of from about 1 minute to about 10 minutes, in a steam application, may be used. The preferred exposure time is about 2 minutes in a steam application. The utilization of a steam heating step again provides a distinct advantage over the prior art by retaining strictly aqueous solvent reaction conditions.

Alternatively, the coated fabric may also be exposed to rapid heating by a microwave or radio frequency heat source, which does not provide an appreciable loss of moisture to the overall elastomer composition. An exposure time of from about 1 second to about 1 minute in a microwave application may be used.

Yet another alternative is to expose the coated fabric to heating by a convection heat source. Preferably, the temperature should be raised slowly to allow the coating to coagulate prior to dry and prevent the coating from cracking. An exposure time of from about 10 seconds to about 10 minutes in a convection oven may be used.

After the first heating step, the composite is dried, preferably by high convection, low temperature heating (preferably, but not limited to, less than 130° C.) or by microwave or radio frequency heating in order to prevent continuous film formation on the fabric surface. The second heating step is engineered to dry the composite without destroying the coagulation of the elastomer composition.

The textile fabric utilized within the inventive process may comprise any synthetic or natural fiber or blend of such fibers. As merely examples, and not intended as limitations, the textile fabric may be constructed from fibers of polyester, nylon (-6 or -6,6), cotton, polyester/cotton blends, wool, ramie, spandex, and the like. The fabric can have a knit, woven, or non-woven construction. The preferred knit substrate is made of polyester, and most preferably polyethylene terephthalate yarns. The preferred woven substrate is made of cotton.

The textile fabric may be treated with dyes, colorants, pigments, ultraviolet absorbers, softening agents, soil redisposition agents, lubricating agents, antioxidants, flame retardants, rheology agents, and the like, either before foaming or after, but with a preference for such additions before foaming. Within the elastomer composition, there may be incorporated any of the above-listed textile additives, as well as lubricating agents or cross-linking agents. One particularly desired agent is a softening/soil redisposition/lubricating additive Lubril QCX™, available from Rhône-Poulenc. Desirable pigments include PP14-912 and PP14-905 available from Stahl.

It is believed that sanding or napping the fabric prior to the application of the elastomeric composition will improve the hand of the fabric-elastomer composite and will improve the adhesion between the fabric and the composition. The sanding or napping process has been found to impart, in the fabric-elastomer composite, a suede-like feel on the effective back of the composite. It is believed that sanding is preferable for knit fabrics and that napping is preferable for woven fabrics.

In addition, in some circumstances, it may be desirable to subject the finished fabric to a calendering process. Calendering improves the adhesion characteristics of the final product (that is, the fabric-elastomer composite that has also been transfer coated). In addition, the calendering process produces a feel similar to that of suede on the effective back of the transfer-coated fabric-elastomer composite. Calendering can be achieved on any equipment designed for such purpose, including, but not limited to, a Briem calender having a heated drum width of approximately 20 inches. Because the settings for temperatures, pressures, and speeds are all related to one another, a range of appropriate settings could be used to achieve the desired effect. For example, one such preferred setting involves a temperature of 150° F., a pressure of 40 kg/cm$^2$, and a speed of 2 yards/minute.

After calendering, the fabric-elastomer composite is subjected to either transfer or film coating to create a three-layer composite structure that resembles genuine leather in both appearance and tactile characteristics. In both transfer and film coating, the additional coating is applied in contact with the elastomer coating. The technical face of the textile becomes the effective back of the three-layer composite. The transfer coating process involves the application of a plurality of individual layers of polyurethane (typically, at least two, but up to five or more) to a paper backing. The coatings are then adhered to the fabric-elastomer composite, and the paper backing is removed, resulting in a three-layer leather-like product. The film coating process involves adhering a sheet-like film substrate to the fabric-elastomer composite, typically using adhesives and heat to laminate the film to the composite. The term "film" is used to mean any thin, flexible, sheet-like substrate, comprising a metallic substrate, a plastic or polymeric film, or a felt-like or flocked textile substrate.

The inventive composite may be utilized as upholstery fabric for furniture or in automobiles; within garments or apparel; or for any other purpose in which a textile leather substitute is desired.

DETAILED DESCRIPTION OF THE PREFERRED EMBODIMENTS

The preferred embodiments of the inventive method and composition are set forth in the following Examples.

EXAMPLE 1

A mixture of 100 grams of EX-62-655 (Stahl), 10 grams of APTEX™ Donor H-Plus (Applied Textile Technologies), 10 grams of Cartafix U™ (Clariant), 0.5 grams of Alkasurf DAP-9 (Rhodia), 4 grams Unifroth 0529 (Unichem, Inc.), and 15 grams of Lubril QCX™ (Rhône-Poulenc), were blended together. The latex was whipped in a Hobart mixer on high for three minutes. A second mixture was made as before but 3.8 grams of Stephanol AM and 3.9 grams of 33% ammonium stearate (Henkel) was substituted for the Unifroth 0529. Again the latex was whipped in a Hobart mixer on high for three minutes. Table 1 shows that the densities of the two resulting foams were approximately equivalent.

TABLE 1

| I.D. | Foam-stabilizing surfactant | Foam Density |
| --- | --- | --- |
| Foam 1 | 4 g Unifroth 0529 | 0.24 g/cc |
| Foam 2 | 3.8 g Stepanol AM and 3.9 g 33% ammonium stearate | 0.25 g/cc |

EXAMPLE 2

A 9 ounce/square yard tricot knit polyester fabric with 85% 100/100 textured filament yarn as the face yarn and 15% 20/1 monofilament as the ground yarn was used as the textile substrate. The fabric was dyed, brushed, dried, and sanded on both sides. A mixture of 100 grams of EX-62-655 (Stahl), 1.5 grams of APTEX™ Donor H-Plus (Applied Textile Technologies), 1.5 grams of Hipochem AG-45 (High Point Chemicals), 3 grams of Cartafix U™ (Clariant), 0.5 grams of Alkasurf DAP-9 (Rhodia), 3.89 grams of 33% ammonium stearate (Henkel), 3.81 grams of Stephanol AM (Stepan), 15 grams of Lubril QCX™ (Rhône-Poulenc), and 0.2 grams of PP14-905 pigment (Stahl) were blended together. The latex was whipped in a Hobart mixer on high for three minutes. The fabric was wet with water and nipped at 40 psi between rollers. The air-incorporated latex foam was spread on the fabric and knife-coated with an 80 mil gap. The fabric was placed in a convection oven at 250° F. (121° C.) for 8 minutes, where the coating coagulated and dried. The resulting textile composite felt like leather and produced excellent synthetic leather when transfer-coated.

EXAMPLE 3

An 8.5 ounce/square yard woven cotton fabric with 57 ends/inch and 68 picks/inch was used as the textile substrate. The fabric was densely napped on the sateen face and was scratch-napped on the back. A mixture of 69.2 grams of Paranol T-6330 (Parachem), 6.9 grams of APTEX™ Donor H-Plus (Applied Textile Technologies), 6.9 grams of Cartafix U™ (Clariant), 0.3 grams of Alkasurf DAP-9 (Rhodia), 2.8 grams of 33% ammonium stearate (Henkel), 2.2 grams of Stephanol AM (Stepan), 10.4 grams of Lubril QCX™ (Rhône Poulenc), and 0.2 grams of PP14-912 pigment (Stahl) were blended together. The latex was foamed with a mechanical foamer (Gaston Systems) using an air-to-latex ratio of 5:1. The foamed latex was knife coated on the fabric with a Mascoe knife coater and coagulated and dried in a tenter-oven at 225° F. for 1.0 minutes and at 250° F. for 0.7 minutes. The resulting textile composite felt like leather and produced excellent synthetic leather when transfer-coated.

What is claimed is:

1. An elastomer composition comprising:
   (i) a waterborne, anionically-stabilized polymer latex;
   (ii) an acid-generating chemical;
   (iii) at least one cloud-point surfactant; and
   (iv) at least one foam-stabilizing surfactant; and
   (v) sufficient gas to produce a foam when incorporated into said elastomer composition.

2. The elastomer composition of claim 1 wherein (ii) is ethylene glycol diacetate.

3. The elastomer composition of claim 1 comprising:
   (i) a waterborne, anionically-stabilized polymer latex;
   (ii) an acid-generating chemical;
   (iii) at least one cloud-point surfactant;
   (iv) at least one foam-stabilizing surfactant; and
   (v) sufficient gas to produce a foam when incorporated into said elastomer composition;
   wherein the weight ratio of (i) to (ii) is from about 5:1 to about 200:1; the weight ratio of (i) to (iii) is from about 5:1 to about 200:1; the weight ratio of (i) to (iv) is from about 5:1 to about 200:1; and the weight ratio of (i) to (v) is from about 0.1:1 to about 50:1.

4. The composition of claim 3 wherein the weight ratio of (i) to (ii) is from about 10:1 to about 50:1; the weight ratio of (i) to (iii) is from about 10:1 to about 50:1; the weight ratio of (i) to (iv) is from about 10:1 to about 50:1; and the weight ratio of (i) to (v) is from about 3:1 to about 8:1.

* * * * *